US006889466B1

(12) United States Patent
Hamlet

(10) Patent No.: US 6,889,466 B1
(45) Date of Patent: May 10, 2005

(54) DEER STOMP SIMULATOR

(75) Inventor: Bruce Randall Hamlet, Howell, MI (US)

(73) Assignee: Hamlett Environmental Technologies Company, Howell, MI (US)

( * ) Notice: Subject to any disclaimer, the term of this patent is extended or adjusted under 35 U.S.C. 154(b) by 0 days.

(21) Appl. No.: 10/614,501

(22) Filed: Oct. 7, 2003

(51) Int. Cl.[7] .......................................... A01M 31/06
(52) U.S. Cl. ............................. 43/2; 446/422; 472/64
(58) Field of Search ...................... 43/1–3; 446/361, 446/422; 472/64

(56) References Cited

U.S. PATENT DOCUMENTS

| 3,439,572 | A | * | 4/1969 | Cohen | 84/402 |
| 4,127,053 | A | * | 11/1978 | Cohen | 84/402 |
| 5,029,408 | A | | 7/1991 | Smith | 43/1 |
| 5,555,664 | A | | 9/1996 | Shockley | 43/1 |
| 5,813,899 | A | * | 9/1998 | Hartley | 446/422 |
| 6,003,261 | A | | 12/1999 | French | 43/1 |
| 6,053,793 | A | | 4/2000 | Green | 446/192 |
| 6,289,626 | B1 | | 9/2001 | Williams | 43/2 |
| 6,357,159 | B1 | * | 3/2002 | Bowling | 43/2 |
| 2003/0200694 | A1 | * | 10/2003 | Burrison | 43/1 |

* cited by examiner

Primary Examiner—Teri P. Luu
Assistant Examiner—Susan C. Alimenti
(74) Attorney, Agent, or Firm—Young & Basile, P.C.

(57) ABSTRACT

A device for imitating the sound of a footfall or stomp of an animal. The device includes a blunt for selectively striking the ground. The blunt can be engaged with a spring and an anchor. A cord can be attached to the spring to draw the blunt back from the ground. The cord can be released and the energy stored in the spring can move the blunt to strike the ground.

13 Claims, 2 Drawing Sheets

DEER STOMP SIMULATOR

FIELD OF THE INVENTION

The invention relates to an apparatus and method for attracting animals, and more specifically, the invention provides a method and apparatus for generating a sound associated with a footfall of an animal.

BACKGROUND OF THE INVENTION

It can be desirable to attract or lure an animal to a particular location. For example, it can be desirable to lure an animal to an area to study the animal in its natural environment. Alternatively, it can be desirable to lure an animal to an area as part of a hunt for sport and/or sustenance.

Known attracting devices have applied different principals to lure animals. For example, prior art devices can substantially replicate the sound associated with antlers. These devices attempt to replicate the sound of antlers clashing or of antlers scraping against a tree. Other attracting devices incorporate scent dispensing means. Still other devices incorporate means for blowing air through a forced air game call. The sound emitted from these air game calls correspond to the sound emitted from the mouth of the animal.

SUMMARY OF THE INVENTION

The present invention provides an apparatus and method for attracting an animal including means for generating a sound associated with a footfall of the animal. The invention can include a blunt operable to selectively strike a surface such as the ground. The blunt can include a substantially hemispherical surface or a sphere.

The invention can also include means for positioning the blunt relative to the surface to be struck. For example, the invention can include a spring that is flexible and resilient. The spring can include a first end engageable with respect to the blunt. The spring at least partially extends along a substantially arcuate path and at least partially extend along a substantially straight path.

The invention can also include an anchor engageable with the spring and insertable with respect to the surface to position the spring and blunt with respect to the surface. The anchor can be formed as a stake and be removably insertable with respect to the ground. The anchor and the spring can be integrally formed with respect to one another. Furthermore, the blunt, spring and anchor can be integrally formed with respect to one another.

The invention can also include means for remotely engaging sound generating means. For example, the blunt, spring and anchor can be positioned with respect to the surface and a cord can be engaged with respect to the spring. The cord can extend a predetermined distance from the spring. An operator can be positioned away from the spring the length of the cord and pull the cord to bias the spring. When the spring is biased from a static position, the blunt is moved away from the surface. The operator can release the cord to allowed the energy stored by the biased spring to move the blunt and strike the ground.

The method of the present invention includes the step of generating a sound associated with a footfall of the animal with sound generating means for attracting an animal. The sound generating means can be remotely engaged. For example, a cord can be attached to a spring and the spring can be biased by moving the cord. The blunt can be moved to be spaced from the surface by biasing the spring with the cord. The cord can be released, releasing the spring. The spring can return to an unbiased condition and move the blunt to strike the surface.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
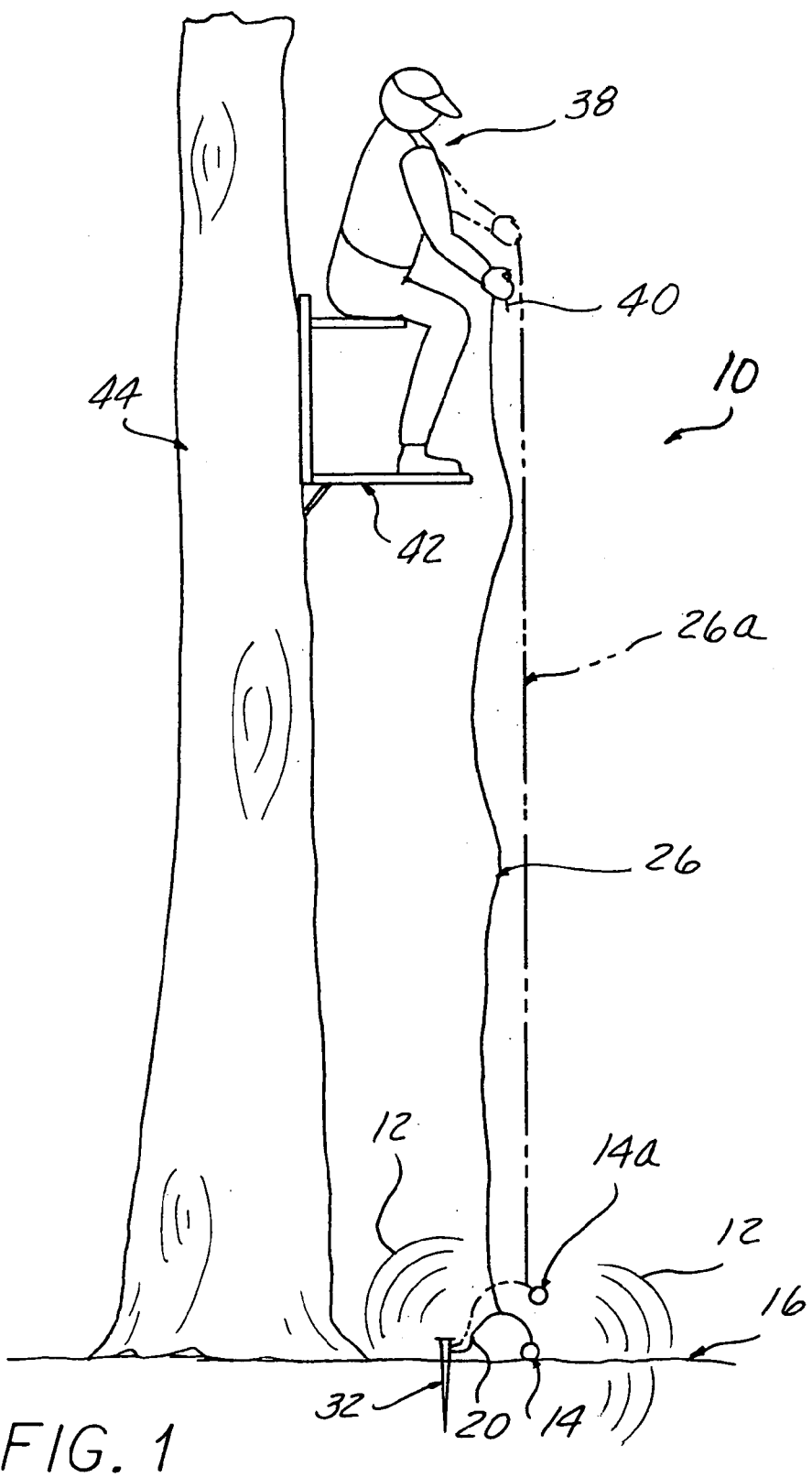
FIG. 1 is a schematic view of the deer stomp simulator according to the present invention wherein the simulator is shown in a retracted or coiled position in dash lines and in a released or striking position in solid lines.
Figure 2:
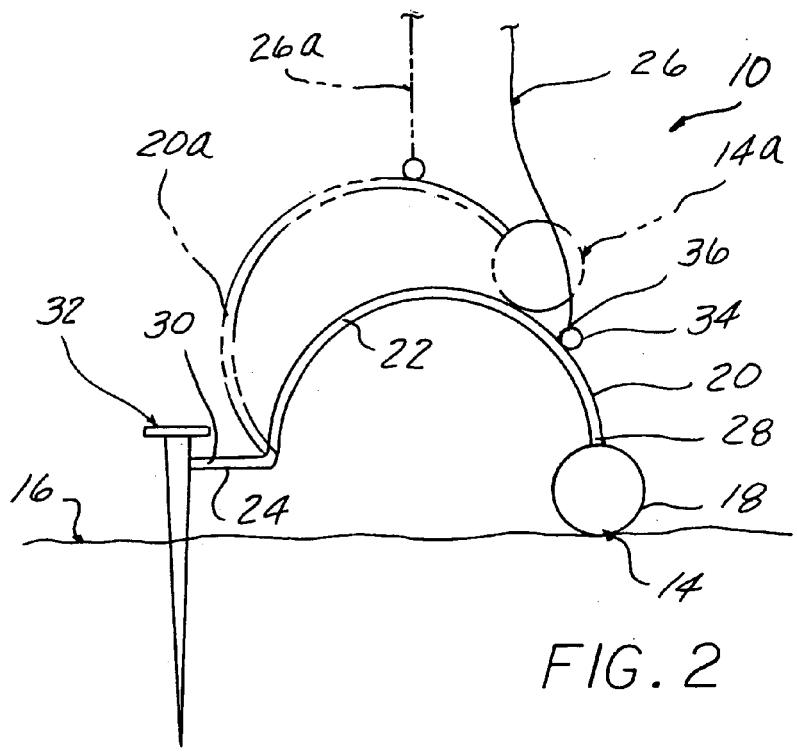
FIG. 2 is a detailed view of the stomp simulator shown in FIG. 1.

The present invention provides an apparatus for attracting an animal including means 10 for generating a sound 12 associated with a footfall of the animal. The animal to be attracted or lured can be a deer, elk, moose or any other animal to be hunted or studied. The sound 12 generated by means 10 is similar to the sound generated by the footfall of the animal during movement of the animal. For example, the sound 12 can be substantially similar as the sound of the footfalls of an animal moving through a forest. Alternatively, the sound can be substantially similar as the sound of an animal stomping the ground. For example, stomping can occur as a form of communication which can provide a male the opportunity to encounter a female for the purpose of mating.

Means 10 can include a blunt 14 operable to selectively strike a surface 16. The blunt 14 can be a substantially solid member such that a sound 12 is generated when the blunt 14 strikes the surface 16. The blunt 14 can define a striking surface 18. The striking surface 18 can be arcuate to enhance the engagement of the blunt 14 with the surface 16. While the striking surface may take on a variety of shapes such as the shape of a deer hoof, the striking surface 18 is identified as a substantially hemispherical surface. Alternatively, the blunt 14 can substantially define a sphere. An operator 38 of means 10 can selectively strike the surface 16 with the blunt 14 to emit sounds 12 in any desired interval or pattern. The operator 38 can move the blunt 14 between at least two positions, wherein the first position defines a retracted position and second position defines a striking position. The blunt 14 can be in contact with the surface 16 when the blunt 14 is in the striking position. The surface 16 can be the ground or a floor of an area where animals dwell, such as the floor of a forest or field.

Means 10 can also include structure for positioning the blunt 14 relative to the surface 16, for control movement of the blunt 14 between the retracted position and the striking position, and for storing energy to be released in moving the blunt 14. Means 10 can include a spring 20 operably associated with respect to a blunt 14. The spring 20 can include a first end 28 engageable with the blunt 14. The blunt 14 can be immovably associated with respect to the first end 28 or can be removably associated with respect to the first end 28. The blunt 14 and spring 20 can be integrally formed with respect to another.

The spring 20 can position the blunt 14 with respect to the surface 16. For example, the spring 20 can position the blunt 14 a predetermined distance from the surface 16 under static loading conditions. In other words, the blunt 14 can be spaced from the surface 16 when not engaged by the operator 38 to strike the surface 16. Alternatively, the spring 20 can position the blunt 14 to be in contact with the surface 16 under static loading conditions without additional energy being stored by the spring 20 to urge the blunt 14 in the direction of the surface 16. Alternatively, the spring 20 can position the blunt 14 to be in contact with the surface 16 under static loading conditions with additional energy being stored by the spring 20 to urge the blunt 14 in the direction of the surface 16. Urging the blunt 14 in the direction of the surface 16 under static loading conditions can be desirable to reduce the likelihood that the blunt 14 will recoil or bounce away from the surface 16 after moving to the striking position and re-striking the surface 16.

The spring 20 can control movement of the blunt 14 between the retracted position and the striking position. For example, the spring 20 can be deformable and resilient. The spring 20 can be deformed to store energy, defining the first configuration corresponding to the retracted position of the blunt 14. The spring 20 can be released from the first configuration and resiliently moved to a second configuration corresponding to the striking position of the blunt 14. The first end 28 moves along a path during resilient movement of the spring 20. The path of movement is defined, at least in part, by the shape of the spring 20 and the direction of deformation of the spring 20. For example, the spring 20 can include a substantially arcuate portion 22 and a substantially straight portion 24. The spring 20 can be deformed by moving the arcuate portion 22 with respect to the straight portion 24, storing energy in the spring 20, and defining the first configuration 20a. The energy stored by spring 20a can be released to move the blunt 14a. The blunt 14a, associated with the first end 28 and in the retracted position, can move along an arcuate path during resilient movement of the spring 20 to the striking position of blunt 14.

The spring 20 can include a second end 30 engageable with respect to the surface 16. The second end 30 can be directly engageable with the surface 16 or indirectly engageable with the surface 16. For example, the second end 30 can be inserted into the ground. Alternatively, the second end 30 can be engaged with respect to an anchor 32. The anchor 32 can be substantially rigid and/or formed as a stake. The anchor 32 can immovably associate the second end 30 with respect to the surface 16. The anchor 32 can cooperate with the spring 20 to form a member for supporting the blunt 14 wherein the member includes a substantially rigid portion and a substantially flexible portion. The spring 20 and the anchor 32 can be integrally formed with respect to one another. The anchor 32 can be releaseably associated with respect to a surface 16.

The invention can also include means for remotely engaging sound generating means 10. Means can include a cord 26 engageable with respect to the blunt 14 to move the blunt 14 between the retracted position and the striking position. The cord 26 can be directly engaged with the blunt 14 or indirectly engaged with the blunt 14. For example, an end 36 of the cord 26 can be immovably associated with the spring 20 to indirectly engage the cord 26 with respect to the blunt 14.

In one embodiment of the invention, the stake 32 can be engaged with respect to the second end 30 of the spring 20 and the blunt 14 can be engaged with respect to the first end 28 of the spring 20. The stake 32 can be inserted in the ground a desired distance to position the blunt 14 in a desired relationship with respect to the surface 16. For example, the blunt 14 can be spaced above the ground, can be in contact with the ground, or can be pressing against the ground. A cord 26 can be engaged with linking means 34 to immovably associate the end 36 of the cord 26 with respect to at least one position defined by the spring 20. An operator 38 of the apparatus 10 can engage a second end 40 of the cord 26, or any portion of the cord between the first end 36 and second end 40, and move to a desired location. The desired location can be a tree stand 42 supported by a tree 44. The operator 38 can draw or pull the cord 26a to move the blunt 14a from to the retracted position. The operator 38 can release the cord 26 or move the end 40 generally toward the spring 20 to release the energy stored by the spring 20 and move the blunt 14 to strike the surface 16. Striking contact between the blunt 14 with the surface 16 produces a sound 12 similar to the sound of a footfall of an animal. The operator 38 can repeat these steps as desired to strike the surface 16 with the blunt 14 and attract an animal.

Figure 3:
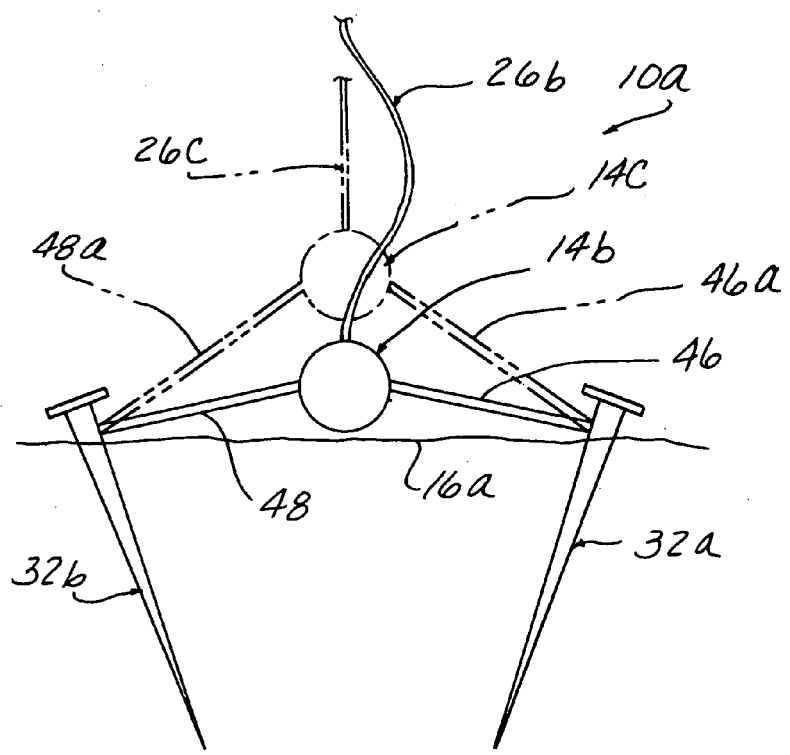
FIG. 3 is a detailed view of an alternative embodiment of the stomp simulator.

Referring now to FIG. 3, means 10a can include cords 46, 48 operably connected to anchors 32a, 32b. Cords 46, 48 can be elastic cords such as bungee cords. An operator can engage the cord 26c to move the blunt 14c to the retracted position. The cords 46a, 48a can stretch and store energy when the blunt 14c is moved to the retracted position. The operator can release the cord 26b or move the cord 26b generally toward the striking surface 16a to release the energy stored by the cords 46a, 48a and move the blunt 14b toward the surface 16a. The blunt 14b is shown intermediately positioned between the retracted position and the striking position.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for attracting an animal comprising:
   means for generating a sound imitating the sound of a footfall of the animal, sound operating means including a blunt operable to selectively strike the ground and means for positioning the blunt relative to the ground wherein positioning means further comprises:
   a spring having a first end and a second end, the spring engageable with respect to the blunt at the first end; and
   an anchor engageable with the second end of the spring and positionable with respect to the ground.

2. The apparatus of claim 1 wherein at least a portion of the positioning means is flexible.

3. The apparatus of claim 1 wherein at least a portion of the positioning means is resilient.

4. The apparatus of claim 1 wherein the anchor is removably engageable with respect to the ground.

5. The apparatus of claim 1 wherein the second end is immovably associated with respect to the ground when the anchor is engaged with respect to the ground.

6. The apparatus of claim 1 further comprising:
   means for remotely biasing the spring.

7. The apparatus of claim 6 wherein biasing means further comprises:
   a cord engageable with the spring.

8. The apparatus of claim 1 wherein positioning means further comprises:
   a plurality of anchors positionable with respect to the ground; and
   a plurality of elastic cords, each cord engageable with respect to the blunt and with respect to at least one of the plurality of anchors.

9. A method for attracting an animal comprising the step of:
   generating a sound which imitates a sound of a footfall of the animal with sound generating means: and
   positioning a blunt spaced from a surface with a spring, the spring having a first end and a second end, the blunt engaged with the first end of the spring.

10. The method of claim 9 further comprising the step of:
    remotely engaging sound generating means.

11. The method of claim 9 wherein the sound generating step further comprises the step of:
    fixedly positioning the second end of the spring relative to the surface.

12. The method of claim 9 wherein the sound generating step further comprises the step of
    biasing the spring away from the surface with biasing means.

13. The method of claim 12 wherein the sound generating step further comprises the step:
    releasing the spring with respect to biasing means; and
    striking the surface with the blunt.

* * * * *